F. BATEMAN.
POTATO DIGGING MACHINE.
APPLICATION FILED JULY 3, 1906.
901,145.
Patented Oct. 13, 1908.
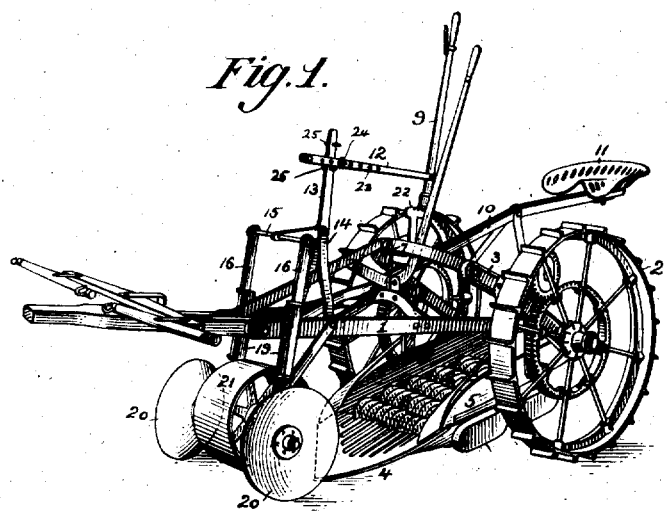
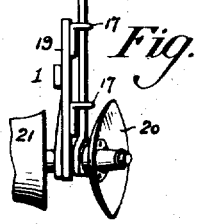
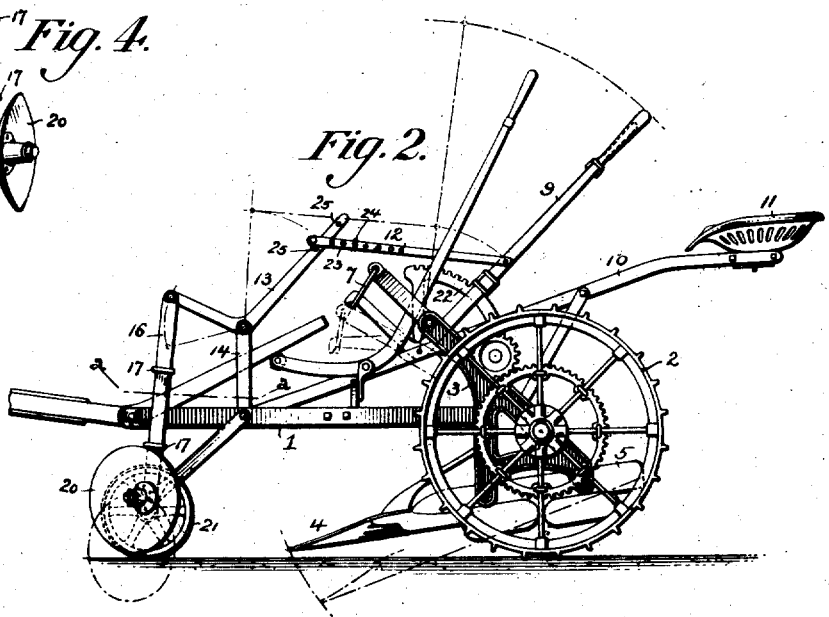
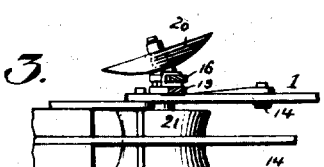
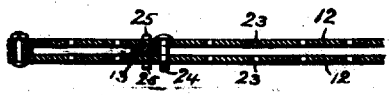
WITNESSES:
H. L. Smith.
Hamilton D. Turner.
INVENTOR
Frank Bateman
BY
Smith & Frazier
ATTORNEYS.

UNITED STATES PATENT OFFICE.

FRANK BATEMAN, OF GRENLOCH, NEW JERSEY, ASSIGNOR TO BATEMAN MANUFACTURING COMPANY, OF GRENLOCH, NEW JERSEY, A CORPORATION OF NEW JERSEY.

POTATO-DIGGING MACHINE.

No. 901,145.  Specification of Letters Patent.  Patented Oct. 13, 1908.

Application filed July 3, 1906. Serial No. 324,589.

*To all whom it may concern:*

Be it known that I, FRANK BATEMAN, a citizen of the United States, residing at Grenloch, New Jersey, have invented certain Improvements in Potato-Digging Machines, of which the following is a specification.

The object of my invention is to provide a potato-digging machine with means for cutting away and casting aside vines and roots which would otherwise interfere with the operation of the digging and separating mechanism of the machine. This object I attain in the manner hereinafter set forth, reference being had to the accompanying drawing, in which Figure 1 is a perspective view of sufficient of a potato-digging machine to illustrate the application of my invention thereto; Fig. 2 is a side elevation of the machine; Fig. 3 is a plan view of part of the same; Fig. 4 is a front elevation of certain of the elements of the machine, and Fig. 5 is a sectional plan view of other parts of the machine.

I have illustrated my invention as applied to a machine of the type shown in the patent of J. S. Robbins, No. 771,800, dated Oct. 4th, 1904, but the invention is applicable to other types of potato diggers as well.

The rigid frame 1 of the machine is mounted upon traction wheels 2, which supply the power for operating those elements of the machine which are not intended to be operated by hand, said frame 1 being provided at the forward end with means for the attachment of a draft team whereby it is drawn over the ground in the direction of the row of potatoes.

Mounted upon the axle of the machine is a swinging frame 3 which carries the shovel-like digging plow 4 and a trough 5 into which the potatoes and other excavated material are directed by said plow, the base of said trough being formed by rows of rotating disks which serve to convey the material from the front to the rear end of the trough.

The upper end of the swinging frame 3 is connected by a link 7 to one arm of a lever 9, which is pivotally mounted upon the central seat-supporting beam 10 of the machine, the other arm of said lever terminating within easy reach of the attendant who occupies the seat 11, and who, by proper manipulation of the lever, can raise the digging mechanism into the elevated or inoperative position shown by full lines in Fig. 2, or can lower it into the operative position shown by dotted lines in said figure. The lever 9 is also connected by a link, or a pair of links, 12 (a pair being shown in the present instance) to one arm of a lever 13 which is pivotally mounted upon the upper portion of a yoke 14 projecting from the frame 1, the other arm of said lever being connected by a transverse rod 15 to the upper ends of a pair of sliding bars 16, which are vertically guided in yokes 17 on suitably braced bars 19, the latter being so connected to the frame 1 of the machine as to constitute proper elements for guiding the bars 16 in their vertical movement.

Rotatably mounted upon the lower ends of the bars 16 are a pair of concavo-convex disks 20, which flank the roller 21 wherewith a machine of this type is usually equipped, said disks being divergently disposed, or located in planes oblique to the longitudinal axial line of the machine. The cutting edges of said disks, it will be noted, are so arranged with respect to the plow that the vines are cut thereby at points within the lateral limits of said plow.

The links 12 are joined together at their outer ends, and each of said links has a series of openings 23, any registering pair of these openings receiving a pin 24, whose adjustment determines the amount of lost motion in the connection between the links and the lever 13.

The links are confined vertically to the lever 13, between certain limits determined by projecting pins 25 on said lever. The disks 20 are therefore always raised to the same point by the full retraction of the lever 9, but on the forward movement of said lever 9, the disks, while depressed to a certain position dependent on the location of the pin 24, are free to descend to a greater extent, because of their weight and that of the parts carrying the same, and they can therefore follow, in a measure, the uneven contour of the surface of the ground, when the potatoes are planted in hills, this freedom of movement of the disks being dependent upon the amount of lost motion between the pin 24 and the end connections of the links.

The positive movements of the lever 13 are effected simultaneously with the like movements of the digging plow 4, the adjustment of the lever 9, to cause said plow to dig a deep or shallow furrow, being determined by engagement of a locking bolt on the lever with one or other of the notches of a locking quadrant 22 on the fixed frame of the machine.

The peripheral portions of the disks 20 are so sharp that said disks will act to sever vines, roots or other vegetable growths with which they engage as the machine is drawn forward, and which have been pressed down onto the surface of the action of the central roller 21 in order to insure effective cutting action of the disks, the several portions, owing to the diverging position of the disks 20, being thrown outwardly on opposite sides of the machine, in order to clear the digging and conveying mechanism, so that they cannot interfere with the performance, by the latter, of its proper function.

I claim:—

1. The combination, in a potato digging machine, of a vertically adjustable digging plow, a pair of vertically adjustable vine cutters mounted in advance of said plow, one on each side of the same, and mechanism for simultaneously raising and lowering the plow and the cutters, said mechanism including an adjustable element whereby movement of the cutters independently of the plow is permitted.

2. The combination, in a potato digging machine, of the digging mechanism, a pair of vertically adjustable vine cutters mounted in advance of said mechanism, one on each side of the same, a lever for adjusting said vine cutters, and a lost motion connection between said lever and the vine cutters.

3. The combination, in a potato digging machine, of the digging mechanism, a pair of vertically adjustable vine cutters mounted in advance of said mechanism, one on each side of the same, a lever for adjusting said vine cutters, a lost motion connection between said lever and the vine cutters, and means for varying the extent of said lost motion.

4. The combination, in a potato digging machine, of the digging mechanism having a vertically adjustable digging plow a pair of vertically adjustable vine cutters in advance of said digging mechanism, one on each side of the same, a plow-and-cutter-adjusting lever, and a variable lost motion connection between said lever and the cutters.

5. The combination, in a potato digging machine, of the digging mechanism, a pair of vertically adjustable vine cutters mounted in advance of said digging mechanism, one on each side of the same, an operating lever for said cutters, a transmitting lever located between the operating lever and the cutters and having projecting pins, one or more links connecting the two levers, and passing between said pins, and stops between which the transmitting lever plays, one of said stops being adjustable.

6. The combination, in a potato digging machine, of the digging mechanism, a pair of vine cutters in advance of said digging mechanism, one on each side of the same, and an interposed roller for holding down the vines for the action of said cutters.

In testimony whereof, I have signed my name to this specification, in the presence of two subscribing witnesses.

FRANK BATEMAN.

Witnesses:
 FRANK H. BELL,
 J. M. EBERT.